United States Patent
Wan et al.

(10) Patent No.: US 10,423,681 B2
(45) Date of Patent: Sep. 24, 2019

(54) SYSTEM FOR HYBRID INCREMENTAL APPROACH TO QUERY PROCESSING AND METHOD THEREFOR

(71) Applicant: WAL-MART STORES, INC., Bentonville, AR (US)

(72) Inventors: Shenghua Wan, Santa Clara, CA (US); Prijith Chandran, San Jose, CA (US); Varun Srivastava, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 905 days.

(21) Appl. No.: 14/851,306

(22) Filed: Sep. 11, 2015

(65) Prior Publication Data
US 2017/0075997 A1   Mar. 16, 2017

(51) Int. Cl.
*G06F 16/9535* (2019.01)
*G06F 16/248* (2019.01)
*G06F 16/955* (2019.01)

(52) U.S. Cl.
CPC ........ *G06F 16/9535* (2019.01); *G06F 16/248* (2019.01); *G06F 16/955* (2019.01)

(58) Field of Classification Search
None
See application file for complete search history.

(56) References Cited

U.S. PATENT DOCUMENTS

| | | | | |
|---|---|---|---|---|
| 2003/0004781 A1* | 1/2003 | Mallon | .......... | G06Q 10/06 705/7.31 |
| 2009/0307296 A1* | 12/2009 | Gibbs | .......... | G06F 17/30029 709/201 |
| 2013/0030870 A1* | 1/2013 | Swinson | .......... | G06Q 10/06 705/7.35 |

* cited by examiner

*Primary Examiner* — Amresh Singh
(74) *Attorney, Agent, or Firm* — Bryan Cave Leighton Paisner LLP

(57) ABSTRACT

A system and method for compiling search results is presented herein. A method can include gathering user behavior data, filtering the user behavior data, performing update calculations on the filtered user behavior data, using a decaying function to aggregate the filtered user behavior data; and facilitating the presentation of aggregated user behavior data. The user behavior data can include the user history for a plurality of users at an Internet-accessible site. The site can be an eCommerce site and the user history can include purchase and browsing history that can be used to determine a popularity of items sold by the eCommerce site. Facilitating the presentation can include displaying products in order of popularity. Other embodiments are also disclosed herein.

20 Claims, 7 Drawing Sheets

SYSTEM FOR HYBRID INCREMENTAL APPROACH TO QUERY PROCESSING AND METHOD THEREFOR

TECHNICAL FIELD

This disclosure relates generally to search engines and more particularly to a system for a hybrid-incremental approach to search query processing and a method therefor.

BACKGROUND

Many organizations can use a search engine as part of their on-line offerings. Examples include search engines such as Google and Bing or on-line retailers, who provide a search engine to allow customers to find products to purchase via an on-line portal, such as a website or a mobile app.

BRIEF DESCRIPTION OF THE DRAWINGS

To facilitate further description of the embodiments, the following drawings are provided in which.

Figure 1:
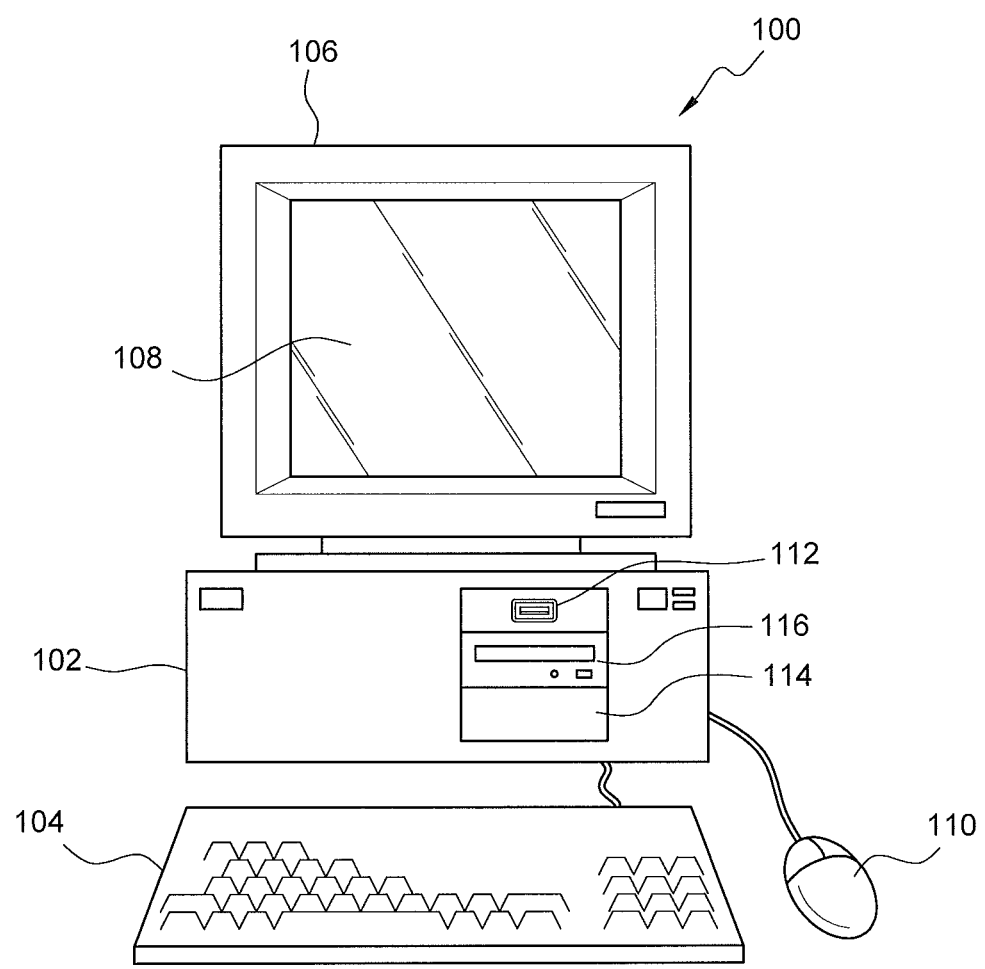
FIG. 1 illustrates a front elevation view of a computer system that is suitable for implementing an embodiment of the system.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a system might comprise: one or more processing modules; and one or more non-transitory storage modules storing computing instructions configured to run on the one or more processing modules and perform the acts of: gathering user behavior data; filtering the user behavior data; performing update calculations on the filtered user behavior data; using a decaying function to aggregate the filtered user behavior data; and facilitating the presentation of aggregated user behavior data; wherein: the user behavior data comprises usage data from a plurality of users; and the aggregated user behavior data includes data indicative of the popularity of one or more data points.

In one embodiment, a method might comprise: gathering user behavior data; filtering the user behavior data; performing update calculations on the filtered user behavior data; using a decaying function to aggregate the filtered user behavior data; and facilitating the presentation of aggregated user behavior data; wherein: the user behavior data comprises usage data from a plurality of users; and the aggregated user behavior data includes data indicative of the popularity of one or more data points.

Figure 2:
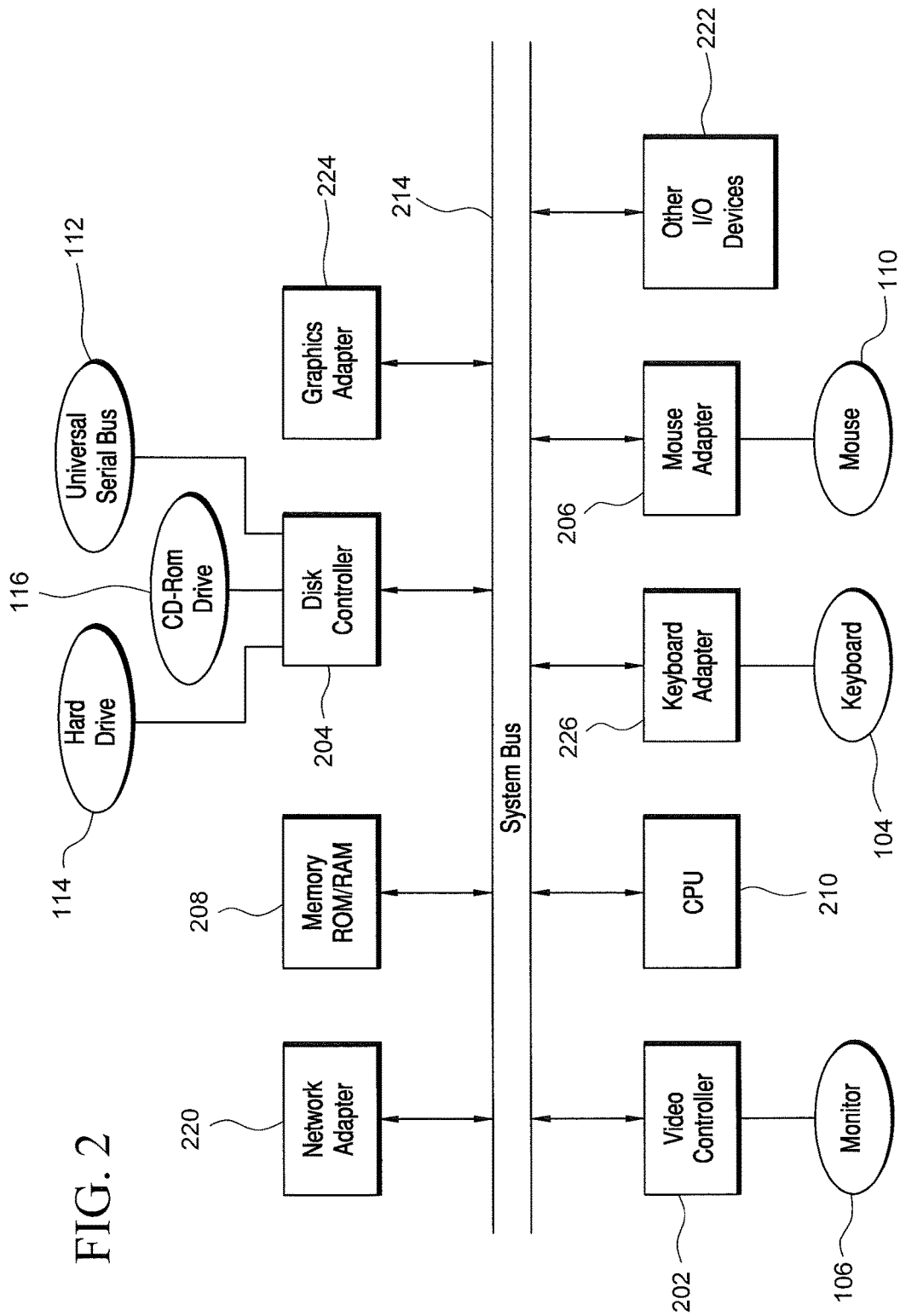
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) also can be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
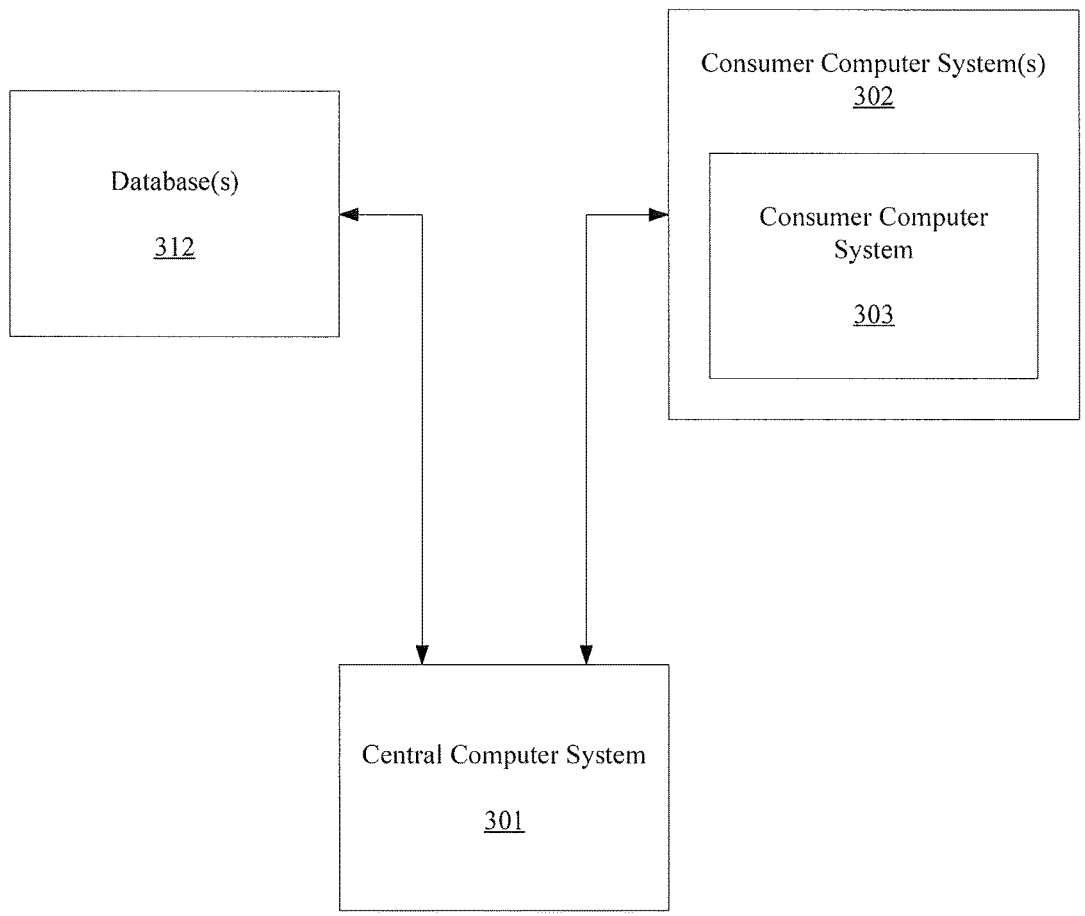
FIG. 3 is a representative block diagram of a system according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.)

performed without consideration of one or more predetermined acts performed by the consumer; and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, consumer computer system(s) 302 each can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™, and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer. But in many embodiments, the functionality of system 300 can be extended to each of consumer computer system(s) 302 and/or to multiple consumers. In these extended examples, in some embodiments, single consumers can interface (e.g., interact) with central computer system 301 with multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

Search engines are a very important part of many different types of businesses. There are websites, such as Bing and Google, that specialize in providing general search results across a wide variety of sites. In addition, individual websites often have a desire to include search capabilities. Websites and forums that provide news or other information might use a search engine to allow users to more easily access information provided in the past. Electronic commerce ("eCommerce") providers use search engines to allow customers the ability to find products they wish to purchase.

To provide more utility to a search engine, search results are often ranked on a variety of different categories. For example, a general search engine often ranks sites based on the relevance and popularity of the site with respect to the search term(s) used. An eCommerce site might wish to rank products based on the popularity of the product based on the search term(s) used.

One problem that one might encounter when processing search results is that there is a high volume of data that must be taken into account. At some sites, there can be 3 or more Gigabytes (GB) of new search data to process every day. In order to provide rankings of the search results, all (or a substantial sample) of the search data is examined to provide accurate ranking data. The ranking data can take many factors into account, such as user demographics, location, time of day, and the like. To provide more accurate ranking data, it might be desirable to analyze search data for various different time periods. That is, instead of ranking sites or items based on search data for a single day, the rankings might be based on longer time periods, such as 7 days, 30 days, 60 days, 180 days, or one year. In fact, time periods of any length might be used. However, the use of a long time periods might require the analysis of an even larger amount of data—if a site has 3 GB of new search data every day to process, it needs to process 540 GB of data if it uses a 180 day time period.

Figure 4:
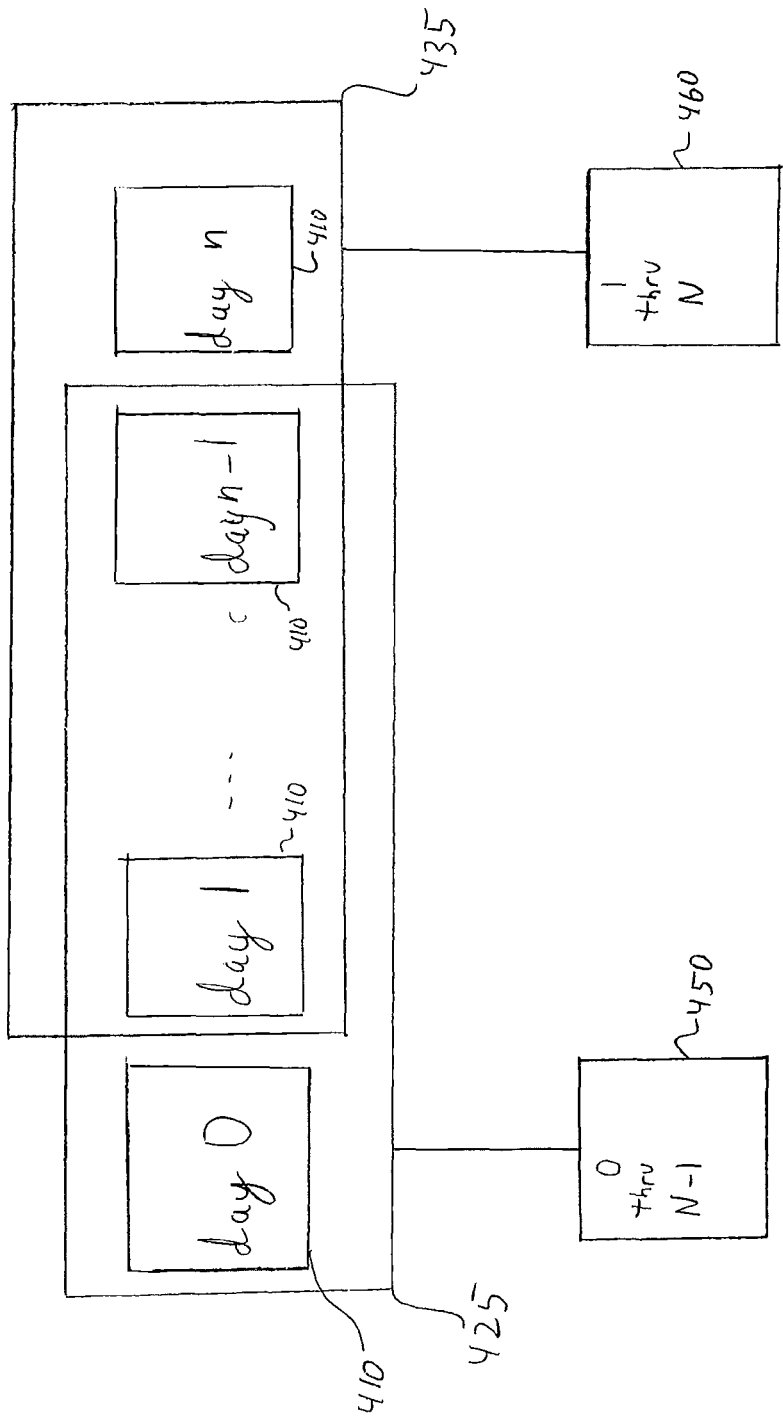
FIG. 4 is a block diagram illustrating the operation of a prior art system.

With reference to FIG. 4, a block diagram illustrating the data processing flow of the prior art is presented. In FIG. 4, each box 410 represents the search data for a single day. There is a box 410 for each day from Day 0 all the way through Day N, where N is the time period used to aggregate search results. As discussed above, in some embodiments, N might be 7 days; in other embodiments, N might range from 30 days to 180 days or even longer. It should be understood that FIG. 4 is merely representative. While box 410 is described as having search data for a day, any other time period (e.g., hours, weeks, months, etc.) can be used instead.

Box 425 illustrates the data that is compiled to result in the rankings of days 0 through N−1 (box 450). Box 435 illustrates the data that is compiled to result in the rankings of days 1 through N (box 460).

In order to compile the search data to generate rankings 450, N number of days of data must be processed, starting at day 0 and going through day (N−1). In order to compile the search data to generate rankings 460, N number of days of data must be processed, starting at day 1 and going through day N. When N is large (such as 180 days) and/or when the amount of data for each day is large (as stated above, there might be 3 GB of data per day), the total amount of data becomes very large and processing such a large amount of data can be processor and/or time intensive. The total amount of data to be processed can become so large that it might not be possible to process data more than once a day, thus not allowing the use of sub-daily data (e.g., changing search rankings based on search results from the first half of the day).

Figure 5:
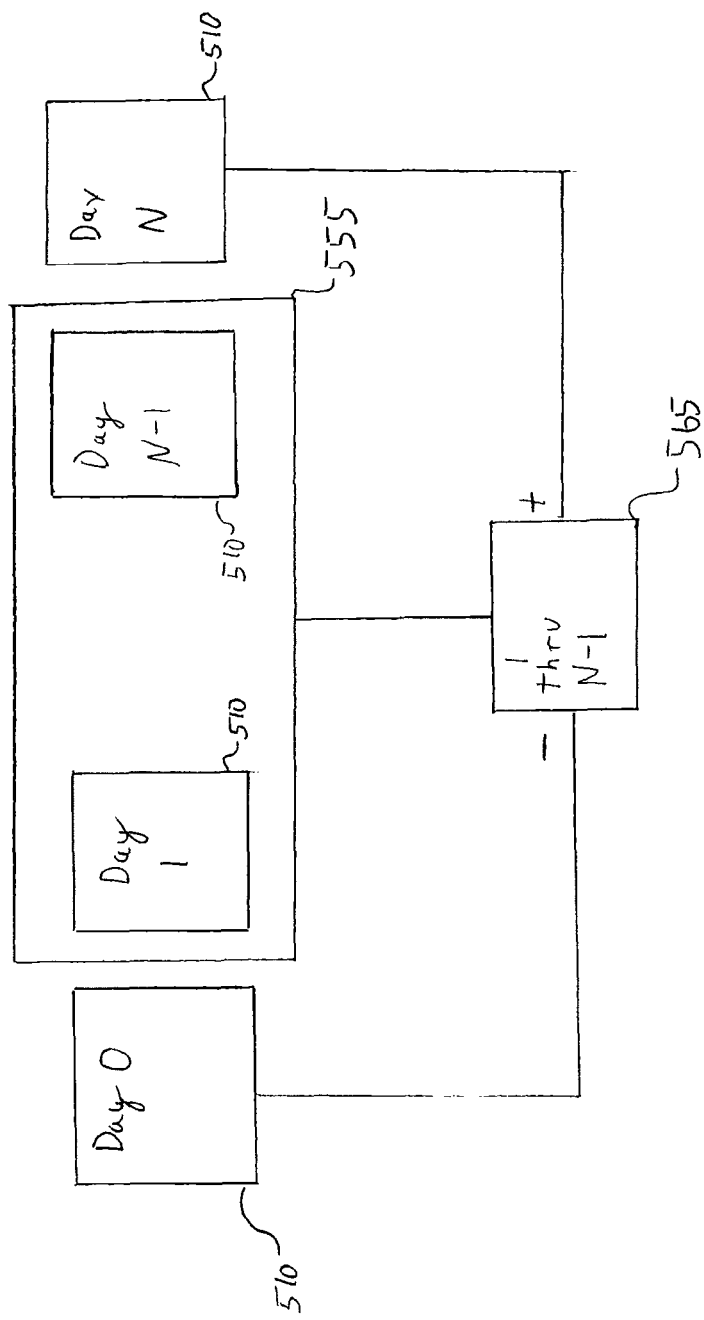
FIG. 5 is a block diagram illustrating the operation of an embodiment.

With reference to FIG. 5, a block diagram illustrating the data processing flow of the prior art is presented. In FIG. 5, each box 510 represents the search data for a day. There is a box 510 for each day from Day 0 all the way through Day N, where N is the time period used to aggregate search results. As discussed above, in some embodiments, N might be 7 days; in other embodiments, N might range from 30 days to 180 days or even longer.

An embodiment takes advantage of the fact that a calculation for a period of N days differs by only 2 days: for any length of N, the only difference is in the first day of the period and the last day of the period. The remaining data is common data between two consecutive time periods. This fact can be leverage for calculation purposes. For example, the data for days 1 through N−1 can be aggregated to form aggregation 565. To calculate the data for a time period of length N, one more day needs to be added. Thus, the aggregation for the time period from day 0 through day N−1 can be determined by calculating the data for days 1 through N−1 and adding the data for day 0. In order to subsequently calculate the data for the time period from day 1 through day N, one takes the previously calculated time period (from day 0 through day N−1) and removes the data for day 0. Thereafter, the data for day N is added. The result is that the searching data for days 1 through N is determined without having to aggregate the data for each day.

While the above presents a theoretical overview of the idea behind various embodiments, the actual equations used are more involved. To provide more details as to the calculation of data, here are various formulas that can be used. A traditional approach to calculate a multi-dimensional item score for each distinct query is represented by the following equation:

$$h(X,\tau,t)=f(\alpha(X,\tau,t))$$

In the above equation, h is the item score to be found, f is a filtering function that extracts query and related information from users who ordered goods from the eCommerce retailer; $\tau$ is an aggregating function that summarizes page views, clicks, additions to carts, orders, and decayed orders; $\tau+1$ is an integer that indicates the number of days in a time window; and t is the date when the score is calculated. In some embodiments, this function is a non-linear function.

Algorithm 1—Procedure Optimization for Linear Aggregation Function

A hybrid incremental approach of an embodiment is as follows. The above equation can be re-designed to find a linear aggregation function as follows:

$g(X,\tau,t)=\alpha_1(f(X,\tau,t),\tau)$ if the following condition is satisfied:

$\alpha_1(a+b)=\alpha_1(a)+\alpha_2(b)$; and $\alpha_1(\lambda a)=\lambda\alpha_1(a)$ for any value of $\lambda$—in other words, $\alpha_1$ is a linear function.

Algorithm 2—Incremental Update for Linear Aggregation Function

Algorithm 1 is further improved as follows:

$g(X,\tau,t+k+1)=\alpha_1(g(X,\tau,t+k),f(X,0,t+k+1),f(X,0,t-\tau+k))$

Where $g(X, \tau, t)$ is calculated on a day t which is zero cost after then and where k is a time factor that is different each day. On each subsequent day, a daily sized data (rather than i-day data, typically $\tau=180$) is calculated as $F(X, 0, t+k+1)$. Note that on day t, $f(X, 0, t-\tau+k)$ has been calculated previously on day $t-\tau+k$. Usually, $\alpha_1$ is a summation function. In that case, the aforementioned formula reduces as follows:

$g(X,\tau,t+k+1)=g(X,\tau,t+k)+f(X,0,t+k+1)-f(X,0,t-\tau+k)$

Algorithm 3—Hybrid Incremental Update for Decaying Order

In the past, a decaying order is a component of the click engagement score vector and is calculated by an exponential function as follows:

$\phi(k,\tau,t)=\Sigma_{i=0}^{\tau}(k_{t+i})e^{\rho i}$

Where $\rho \in R$ is a constant number and k is a time series of factors which is different on each day. In other words, on day t, $k_t$ is obtained via another procedure. This equation can be computationally intensive and time intensive because the data for each day is calculated separately and placed into the summation equation.

At the end of a day, algorithm 1 can be applied to calculate an item score in a window of $\tau$ days. Alternatively, an incremental update for this specific $\phi$ can be solved by the following equation:

$$\phi(k, \tau, t+k+1) = \frac{\phi(k, \tau, t+k) - k_0}{e} + (k_{t+k+1})e^{\rho t}$$

It can be seen that this formula is a roughly represented by FIG. 5, as the data from previous calculations is represented by the first term and the data for the most recent time period is represented by the second term.

The equation is not limited to time periods of one day. In sub-daily frequency, for example, every four hours, an incremental approach similar to algorithm 2 can be used.

$\phi(k,\tau,t,h+\delta)=\phi(k,\tau,t,h)+k_t^{h+\sigma}e^{\rho t}$

Where $\delta$ is the sub-daily frequency of incoming additional user behavior data; $\phi(k, \tau, t, h)$ is processed query understanding data; h is the hour at which the function is being used; and k is also provided in sub-daily frequency, e.g., $k_t^{h+\sigma}$. \

The re-designed Algorithm 1 greatly reduces the computational load by first filtering and projecting the raw user behavior data, including, but not limited to, clicks, page view, orders, and the addition of products to a shopping cart, to generate much smaller-sized data. In some embodiments, the data might range from 0.3% to 5% of the original size within a six-month window. This processed data can then be aggregated using a linear function such as summation. The aggregation might be very expensive and dominant in computation time.

Algorithm 2 reduces the amount of daily computation. Therefore, the processing time is greatly reduced. Instead of calculating on 180-day behavior data (or whatever the chosen time period is), the algorithm calculates only one-day's data, which is then aggregated with the previous day's result. The aggregate result is much more lightweight compared to raw data. This algorithm will accelerate updates based on user behavior. The behavior of the users also will be reflected sooner in search query understanding results on the eCommerce provider's website. In addition, sub-daily refresh of search queries will be possible, providing more accurate search results both for customers and for the eCommerce provider.

The approach presented in Algorithm 3 is a hybrid approach that provides a unified solution to incrementally update query understanding information combining the benefits of algorithms 1 and 2.

Figure 6:
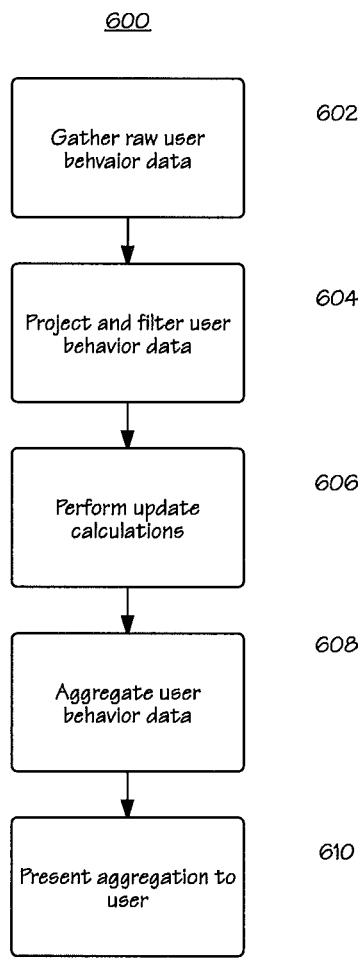
FIG. 6 is a flowchart illustrating the operation of an embodiment.

FIG. 6 will now show a flowchart illustrating the operation of a method 600 of aggregating search data. Method 600 is merely exemplary and is not limited to the embodiments presented herein. Method 600 can be employed in many different embodiments or examples not specifically depicted or described herein. In some embodiments, the procedures, the processes and/or the activities of method 600 can be performed in the order presented. In other embodiments, the procedures, the processes, and/or the activities of method 600 can be performed in any other suitable order. In still other embodiments, one or more of the procedures, the processes, and/or the activities of method 600 can be combined or skipped. In some embodiments, method 600 can be implemented by computer system 100 (FIG. 1). In some embodiments, method 600 can be implemented by central computer system 301 (FIG. 3).

Raw user behavior data is gathered for a certain time period (block 602). The raw user behavior data might include one or more of the following: clicks per link or page, page views, orders, and the additions of products to a shopping cart, each of which could be zero. Raw user behavior data includes data from all users of a particular eCommerce site. This data can include users of a mobile app accessible by a mobile device and users of a web interface for an eCommerce site.

The raw user behavior data is projected and filtered (block 604). This process can be accomplished using a linear aggregation formula such as a summation.

This process results in data for an initial period of time. Update calculations for subsequent time periods can then be performed for later time periods (block 606). This update can be accomplished using an incremental update algorithm such as that given previously as Algorithm 2:

$g(X,\tau,t+k+1)=g(X,\tau,t+k)+f(X,0,t+k+1)-f(X,0,t-\tau+k)$.

Thereafter, a decaying function can be used to aggregate user behavior data for new time periods with the previously calculated data (block 608). This aggregation can be accomplished using a hybrid incremental update algorithm such as that given previously as Algorithm 3:

$\phi(k,\tau,t,h+\delta)=\phi(k,\tau,t,h)+k_t^{h+\sigma}e^{\rho t}$.

Once the aggregations are performed for the time period in question, the aggregation can be presented to a user in one of a variety of different manners, both directly and indirectly (block 610). For example, the aggregation can be used when responding to a user's query, by ordering the presentation of search results to the user. The aggregation can be used to show a user a "top 10" list of items in a category, to show the user which products are popular. In addition, the aggregation can be used by the eCommerce provider so that they can determine which products are popular and which products are not. The presentation to the users can occur in a variety of different manners known in the art. In some embodiments, the presentation occurs by using a web interface or mobile app interface. In some embodiments, presentation occurs by facilitating the display of search results in an order determined by the calculations.

Figure 7:
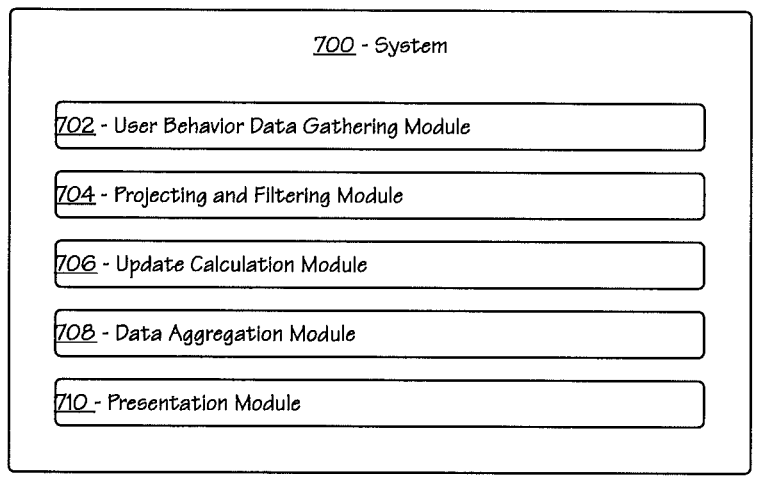
FIG. 7 is a block diagram of a system capable of performing an embodiment.

Turning ahead in the figures, FIG. 7 illustrates a block diagram of a system 700 that is capable of performing disclosed embodiments. System 700 is merely exemplary and is not limited to the embodiments presented herein. System 700 can be employed in many different embodiments or examples not specifically depicted or described herein. In some embodiments, certain elements or modules of system 700 can perform various procedures, processes, and/or acts. In other embodiments, the procedures, processes, and/or acts can be performed by other suitable elements or modules. System 700 can be an implementation of computer system 100 (FIG. 1) and/or central computer system 301 (FIG. 3).

In a number of embodiments, system 700 can include user behavior data gathering module 702. In certain embodiments, user behavior data gathering module 702 can perform block 602 (FIG. 6) of gathering user behavior data.

In a number of embodiments, system 700 can include projecting and filtering module 704. In certain embodiments, projecting and filtering module 704 can perform block 604 (FIG. 6) of projecting and filtering user behavior data.

In a number of embodiments, system 700 can include update calculation module 706. In certain embodiments, update calculation module 706 can perform block 606 (FIG. 6) of using an incremental update algorithm to perform calculations.

In a number of embodiments, system 700 can include data aggregation module 708. In certain embodiments, data aggregation module 708 can perform block 608 (FIG. 6) of aggregating user behavior data.

In a number of embodiments, system 700 can include presentation module 710. In certain embodiments, presentation module 710 can perform block 610 (FIG. 6) of presenting the calculations to users.

While portions of the above disclosure discussed the usage of embodiments in conjunction by an eCommerce provider, it should be understood that embodiments are not so limited. Embodiments can be used in any situation in which it is desired to aggregate data from multiple time periods. Exemplary situations in which embodiments can be used can include search engines, computer databases, Internet-accessible sites (such as message boards and news websites) and the like.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 can be modified, and that the foregoing discussion of certain of these embodiments does not necessarily represent a complete description of all possible embodiments. For example, one or more of the procedures, processes, or activities of FIGS. 1-7 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processing modules; and
one or more non-transitory storage modules storing computing instructions configured to run on the one or more processing modules and perform acts of:
gathering user behavior data;
filtering the user behavior data using an incremental update algorithm to create filtered user behavior data;
performing update calculations on the filtered user behavior data;
using a decaying function to aggregate the filtered user behavior data to create aggregated filtered user behavior data, the decaying function comprising at least one exponential term; and
facilitating a presentation of the aggregated filtered user behavior data, wherein:
the user behavior data comprises usage data from a plurality of users;
the aggregated filtered user behavior data comprises data indicative of a popularity of one or more data points;
the incremental update algorithm comprises:

$g(X,\tau,t+k+1)=g(X,\tau,t+k)+f(X,0,t+k+1)-f(X,0,t-\tau+k);$ f comprises a filtering function that extracts usage data;
$\tau+1$ comprises a number of time periods in a time window;
t comprises a date when a formula is calculated;
k comprises an incremental time period; and
g comprises an incremental update function.

2. The system of claim 1 wherein:
the user behavior data comprises:
usage data of a plurality of users of an Internet-accessible site, including a count of each click per link or per page at the Internet-accessible site and page views for each page of the Internet-accessible site.

3. The system of claim 2 wherein:
the Internet-accessible site is an eCommerce site; and
the user behavior data further comprises:
- orders for each product of the eCommerce site; and
- a number of additions to a shopping cart for each product of the eCommerce site.

4. The system of claim 3, wherein:
the aggregated filtered user behavior data is presented on the eCommerce site.

5. The system of claim 1 wherein:
filtering the user behavior data comprises using a linear aggregation formula on the user behavior data.

6. The system of claim 1 wherein:
the decaying function comprises:

$$\phi(k, \tau, t+k+1) = \frac{\phi(k, \tau, t+k) - k_0}{e} + (k_{t+k+1})e^{\rho t};$$

$\rho$ comprises a constant;
k comprises a time series of factors that is different for each time period;
$\tau+1$ comprises a number of time periods in a time window; and
t comprises a date when the formula is calculated.

7. The system of claim 6 wherein:
the each time period of the time periods is less than one day;
the decaying function comprises:

$$\phi(k,\tau,t,h+\delta) = \phi(k,\tau,t,h) + k_t^{h+\sigma t}e^{\rho t};$$

h comprises the time period; and
$\delta$ comprises a sub-daily frequency of incoming additional user behavior data.

8. The system of claim 1 wherein:
facilitating the presentation of the aggregated filtered user behavior data comprises determining an order of display of items based on the aggregated filtered user behavior data.

9. The system of claim 1 wherein:
the user behavior data comprises:
- usage data of a plurality of users of an Internet-accessible site, including a count of each click at the Internet-accessible site and page views for each page of the Internet-accessible site;

the Internet-accessible site comprises an eCommerce site;
the user behavior data further comprises:
- orders for each product of the eCommerce site; and
- a number of additions to a shopping cart for each product of the eCommerce site;

filtering the user behavior data comprises using a linear aggregation formula on the user behavior data;
the decaying function comprises:

$$\phi(k, \tau, t+k+1) = \frac{\phi(k, \tau, t+k) - k_0}{e} + (k_{t+k+1})e^{\rho t};$$

$\rho$ comprises a constant;
k comprises a time series of factors that is different for each time period;
$\tau+1$ comprises a number of time periods in a time window;
t comprises a date when the formula is calculated; and
facilitating the presentation of the aggregated filtered user behavior data comprises determining an order of display of items based on the aggregated filtered user behavior data.

10. The system of claim 1, wherein:
the aggregated filtered user behavior data is presented on a mobile application.

11. A method comprising:
gathering user behavior data;
filtering the user behavior data using an incremental update algorithm to create filtered user behavior data;
performing update calculations on the filtered user behavior data;
using a decaying function to aggregate the filtered user behavior data to create aggregated filtered user behavior data, the decaying function comprising at least one exponential term; and
facilitating a presentation of the aggregated filtered user behavior data wherein:
  the user behavior data comprises usage data from a plurality of users;
  the aggregated filtered user behavior data comprises data indicative of a popularity of one or more data points;
  the incremental update algorithm comprises:

$$g(X,\tau,t+k+1) = g(X,\tau,t+k) + f(X,0,t+k+1) - f(X,0,t-\tau+k);$$

f comprises a filtering function that extracts usage data;
$\tau+1$ comprises a number of time periods in a time window;
t comprises a date when a formula is calculated;
k comprises an incremental time period; and
g comprises an incremental update function.

12. The method of claim 11 wherein:
the user behavior data comprises usage data of a plurality of users of an Internet-accessible site, including a count of each click at the Internet-accessible site and page views for each page of the Internet-accessible site.

13. The method of claim 12 wherein:
the Internet-accessible site is an eCommerce site; and
the user behavior data further comprises:
- orders for each product of the eCommerce site; and
- a number of additions to a shopping cart for each product of the eCommerce site.

14. The method of claim 13, wherein:
the aggregated filtered user behavior data is presented on the eCommerce site.

15. The method of claim 11 wherein:
filtering the user behavior data comprises using a linear aggregation formula on the user behavior data.

16. The method of claim 11 wherein:
the decaying function comprises:

$$\phi(k, \tau, t+k+1) = \frac{\phi(k, \tau, t+k) - k_0}{e} + (k_{t+k+1})e^{\rho t};$$

$\rho$ comprises a constant;
k comprises a time series of factors that is different for each time period;
$\tau+1$ comprises a number of time periods in a time window; and
t comprises a date when the formula is calculated.

17. The method of claim 16 wherein:
the each time period of the time periods is less than one day;
the decaying function comprises:

$$\phi(k,\tau,t,h+\delta)=\phi(k,\tau,t,h)+k_t^{h+\sigma}e^{\rho t};$$

h comprises the time period; and
δ comprises a sub-daily frequency of incoming additional user behavior data.

18. The method of claim 11 wherein:
facilitating the presentation of the aggregated filtered user behavior data comprises determining an order of display of items based on the aggregated filtered user behavior data.

19. The method of claim 11 wherein:
the user behavior data comprises:
usage data of a plurality of users of an Internet-accessible site, including a count of each click at the Internet-accessible site and page views for each page of the Internet-accessible site;
the Internet-accessible site comprises an eCommerce site;
the user behavior data further comprises:
orders for each product of the eCommerce site; and
a number of additions to a shopping cart for each product of the eCommerce site;
filtering the user behavior data comprises using a linear aggregation formula on the user behavior data;
the decaying function comprises:

$$\phi(k,\tau,t+k+1) = \frac{\phi(k,\tau,t+k)-k_0}{e} + (k_{t+k+1})e^{\rho t},$$

ρ comprises a constant;
k comprises a time series of factors that is different for each time period;
τ+1 comprises a number of time periods in a time window;
t comprises a date when the formula is calculated; and
facilitating the presentation of the aggregated filtered user behavior data comprises determining an order of display of items based on the aggregated filtered user behavior data.

20. The method of claim 11, wherein:
the aggregated filtered user behavior data is presented on a mobile application.

* * * * *